(12) United States Patent
Kim et al.

(10) Patent No.: US 8,488,236 B2
(45) Date of Patent: Jul. 16, 2013

(54) OPTICAL SYSTEM FOR THERMAL IMAGE MICROSCOPE

(75) Inventors: Geon Hee Kim, Daejeon (KR); Sun Choel Yang, Daejeon (KR); Ki Soo Chang, Daejeon (KR); Hyo Sik Kim, Daejeon (KR); Sang Hyeok Kim, Yongin-si (KR); Sang Yong Lee, Daejeon (KR)

(73) Assignee: Korea Basic Science Institute, Daejeon (KR)

( * ) Notice: Subject to any disclaimer, the term of this patent is extended or adjusted under 35 U.S.C. 154(b) by 33 days.

(21) Appl. No.: 13/375,784

(22) PCT Filed: Nov. 10, 2010

(86) PCT No.: PCT/KR2010/007923
§ 371 (c)(1),
(2), (4) Date: Dec. 2, 2011

(87) PCT Pub. No.: WO2011/059232
PCT Pub. Date: May 19, 2011

(65) Prior Publication Data
US 2012/0075693 A1  Mar. 29, 2012

(30) Foreign Application Priority Data
Nov. 13, 2009 (KR) .................. 10-2009-0109827

(51) Int. Cl.
G02B 13/14 (2006.01)
G02B 21/02 (2006.01)

(52) U.S. Cl.
CPC ............. *G02B 13/14* (2013.01); *G02B 21/02* (2013.01)
USPC ............ 359/357; 359/356; 359/658; 359/754

(58) Field of Classification Search
USPC .................. 359/350–361, 656–661, 754–795
See application file for complete search history.

(56) References Cited

U.S. PATENT DOCUMENTS 7,215,478 B1 * 5/2007 Hirata ........................... 359/656
7,280,273 B2 * 10/2007 Tejada et al. .................. 359/356
2003/0147128 A1 8/2003 Shafer et al.

FOREIGN PATENT DOCUMENTS

JP 2007286310 11/2007
JP 2009122624 6/2009

* cited by examiner

*Primary Examiner* — Thong Nguyen
(74) *Attorney, Agent, or Firm* — IPLA P.A.; James E. Bame

(57) ABSTRACT

Provided is an optical system for a thermal image microscope. The optical system includes an image forming unit and a relay unit. The image forming unit forms a focus. The relay unit elongates an optical path. Here, the image forming unit includes six lenses. The relay unit includes two lenses. Aspherical surfaces of the lenses are all convex surfaces.

4 Claims, 5 Drawing Sheets

OPTICAL SYSTEM FOR THERMAL IMAGE MICROSCOPE

BACKGROUND OF THE INVENTION

The present invention relates to an optical system, and more particularly, to an optical system for a thermal image microscope.

Generally, an optical system is an important component because it defines the performance of apparatuses and machines to which the optical system is applied. The thermal image microscope can analyze a sample by applying a specific temperature to a subject to photograph the changing shape of a subject or analyzing temperature analysis values into graph or data.

The optical system may be configured with one lens. However, with the recent development of technology, functional lenses for removing or correcting aberration generated by a lens itself have been developed, and these lenses are appropriately combined to each other to form a complex lens optical system.

Particularly, the functional lens optical system has already become a general trend in the field of digital camera that prioritizes miniaturization and image quality improvement of an apparatus. Also, attempts to graft the complex lens optical system onto the field of thermal sensing apparatus are being made to improve its functional improvement in the field of thermal sensing apparatus for sensing/detecting heat from a human body or an object by sensing heat through transmission of infrared ray. Examples of thermal sensing apparatuses may include surveillance cameras, non-contact thermal measurers, and infrared ray detectors.

However, an excessive number of lenses are being used in a typical optical system for a thermal sensing apparatus, and the shape of the lens is mainly limited to a spherical optical system. Accordingly, there are many limiting factors in miniaturization of an optical system, and image quality improvement and camera brightness for improving the function of the optical system.

SUMMARY OF THE INVENTION

The present invention provides an optical system for a thermal image microscope, in which measurement accuracy is improved through analysis of an optical path and aberration of the optical system.

The present invention also provides an optical system for a thermal image microscope, which can be easily processed by selectively using spherical surfaces or aspherical surfaces, convex and concave lenses, germanium and silicon lenses.

In accordance with an exemplary embodiment, an optical system for a thermal image microscope includes: an image forming unit for forming a focus; and a relay unit for elongating an optical path, wherein: the image forming unit includes a plurality of lenses; the relay unit includes a plurality of lenses; aspherical surfaces of the lenses are all convex surfaces; the plurality of lenses of the image forming unit includes: a first lens having a first a surface that is a concave surface having a negative refracting power toward an object and a first b surface that is a convex surface having a positive refracting power toward an image; a second lens having a second a surface that is a convex surface having a positive refracting power toward the object and a second b surface that is a concave surface having a negative refracting power toward the image; a third lens having a third a surface that is a convex surface having a positive refracting power toward the object and a third b surface that is a concave surface having a negative refracting power toward the image; a fourth lens having a fourth a surface that is convex surface having a positive refracting power toward the object and a fourth b surface that is a concave surface having a negative refracting power toward the image; a fifth lens having a fifth a surface that is a convex surface having a positive refracting power toward the object and a fifth b surface that is a concave surface having a negative refracting power toward the image; and a sixth lens having a sixth a surface that is a concave surface having a negative refracting power toward the object and a sixth b surface that is convex surface having a positive refracting power toward the image; and the plurality of lenses of the relay unit includes: a seventh lens having a seventh a surface that is a concave surface having a negative refracting power toward the object and a seventh b surface that is a convex surface having a positive refracting power toward the image; and an eighth lens having an eighth a surface that is a concave surface having a negative refracting power toward the object and an eighth b surface that is a convex surface having a positive refracting power toward the image.

The third a surface, the fifth a surface, the sixth b surface, and the seventh b surface may be aspherical surfaces, and other surfaces may be spherical surfaces.

The first lens, the second lens, the fourth lens and the eighth lens may be formed of silicon, and the third lens, the fifth lens, the sixth lens and the seventh lens may be formed of germanium.

The radius of each of lenses and the thickness at the center of each of lenses satisfy Table 1 below.

According to an embodiment of the present invention, more precise measurement can be performed by improving the measurement accuracy through optical path and aberration analysis of an optical system. Particularly, since the present invention can be used at a wavelength of about 3 μm to about 5 μm, it is possible to detect an error from a semiconductor process.

Also, the optical system can be formed by selectively using aspherical and spherical surfaces, convex and concave lenses, and germanium and silicon lenses.

BRIEF DESCRIPTION OF THE DRAWINGS

Exemplary embodiments can be understood in more detail from the following description taken in conjunction with the accompanying drawings, in which.

DETAILED DESCRIPTION OF THE INVENTION

Hereinafter, exemplary embodiments of the present invention will be described in detail with reference to the accompanying drawings.

An optical system for a thermal image microscope may include a spherical lens and an aspherical lens combined with each other. The lenses may be formed of germanium or silicon. In this configuration, an aspherical surface shaping process may be easily applied to the manufacture of the optical system.

The optical system may have a resolution of about 4 μm with respect to a sample placed at a distance of about 15 nm, and Numerical Aperture (NA) may be about 0.65. In the optical system according to an embodiment of the present invention, an aspherical surface lens may be used to solve chromatic aberration and different aberrations inevitably occurring because the optical system is configured to be used at a wavelength of about 3 μm to about 5 μm, i.e., an infrared ray wavelength band and magnify a close object with five-fold magnification for observation. The aspherical lens may be limited to a convex surface for convenience of processing. The optical system for the thermal image microscope may be roughly divided into an image forming unit up to the sixth lens and a relay unit including the seventh and eighth lenses. Since, in the relay unit, a cold stop is located at the side of a sensor, the large-caliber of the image forming unit may be prevented while having a maximum resolution without a light intensity loss.

Figure 1:
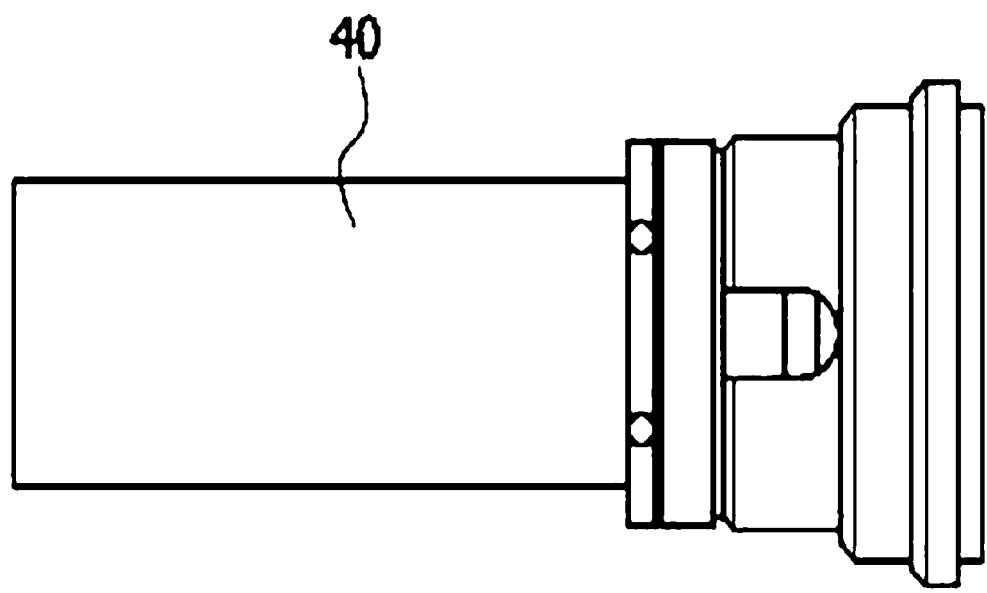
FIG. 1 is a side view of an optical system according to an embodiment of the present invention.

FIG. 1 is a side view of an optical system for a thermal image microscope according to an embodiment of the present invention.

Referring to FIG. 1, the optical system may include a case 40 defining the exterior thereof and housing a plurality of lenses therein.

Various sizes of lenses may be arranged at various intervals in the case 40.

Figure 2:
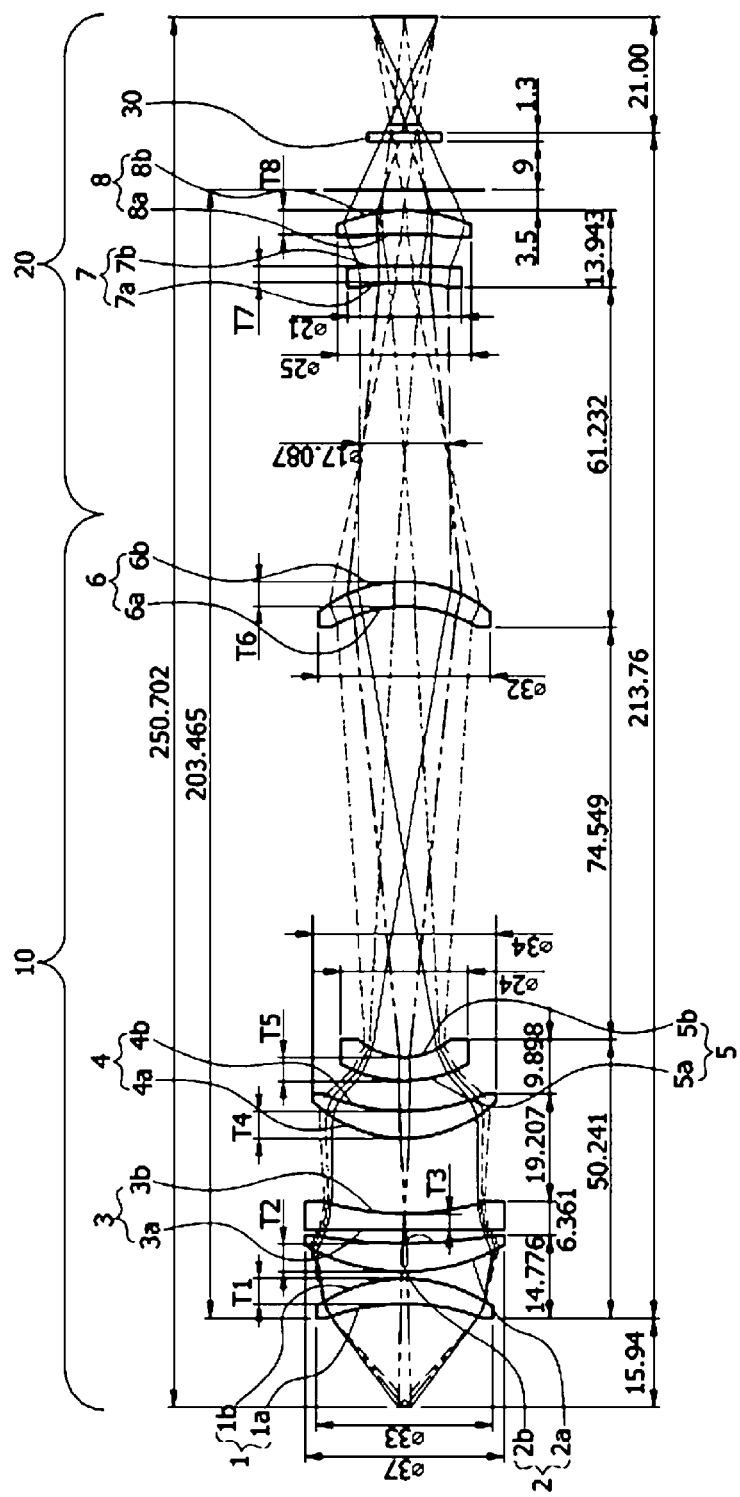
FIG. 2 is a side view illustrating a configuration of an optical system according to an embodiment of the present invention.
Figure 3:
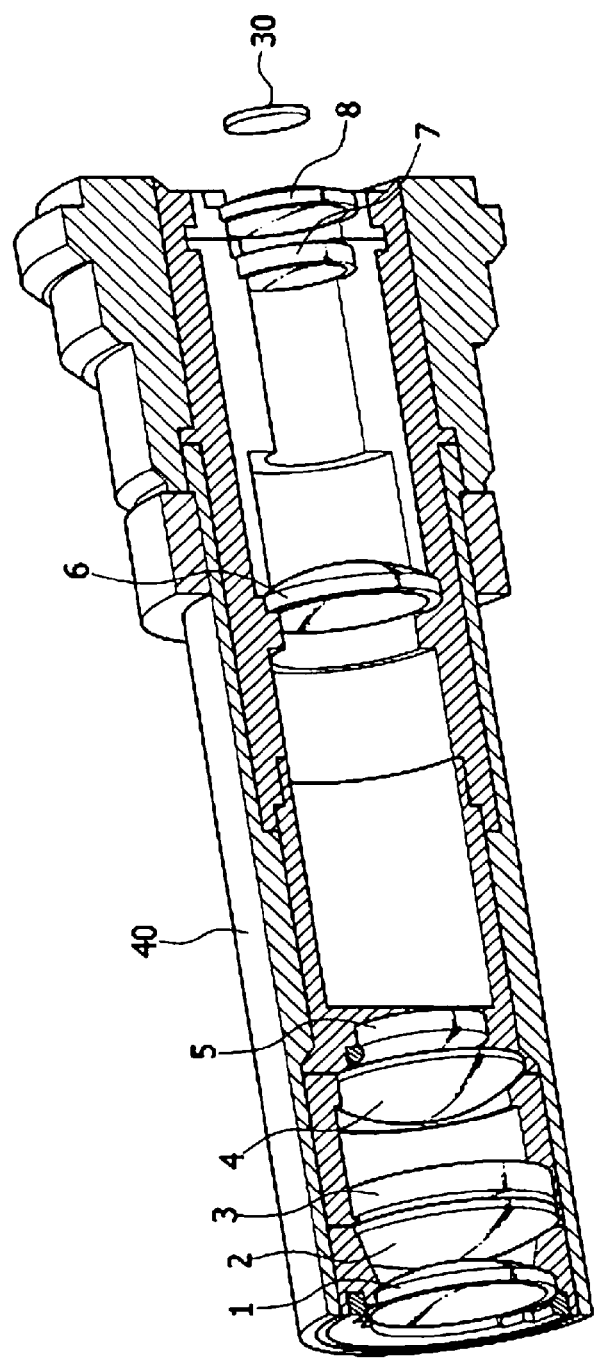
FIG. 3 is a cross-sectional view of an optical system according to an embodiment of the present invention.

FIG. 2 is a side view illustrating a configuration of an optical system for a thermal image microscope according to an embodiment of the present invention. FIG. 3 is a cross-sectional view of an optical system for a thermal image microscope according to an embodiment of the present invention.

Referring to FIGS. 2 and 3, the optical system for the thermal image microscope may include an image forming unit in which a focus is formed and a relay unit 20 which elongates an optical path. The image forming unit 10 may be disposed at side of an object, and the relay unit 20 may be disposed at the side of image.

The image forming unit 10 may include six lenses, and the relay unit 20 may include two lenses.

The image forming unit 10 may include a first lens 1, a second lens 2, a third lens 3, a fourth lens 4, a fifth lens 5, and a sixth lens 6, which are sequentially arranged and become more distant from an object.

The first lens 1 may have a first a surface 1a that is a concave surface having a negative refracting power toward an object and a first b surface 1b that is a convex surface having a positive refracting power toward an image, and the second lens 2 may have a second a surface 2a that is a convex surface having a positive refracting power toward the object and a second b surface 2b that is a concave surface having a negative refracting power toward the image.

The third lens 3 may have a third a surface 3a that is a convex surface having a positive refracting power toward the object and a third b surface 3b that is a concave surface having a negative refracting power toward the image, and the fourth lens 4 may have a fourth a surface 4a that is convex surface having a positive refracting power toward the object and a fourth b surface 4b that is a concave surface having a negative refracting power toward the image.

The fifth lens 5 may have a fifth a surface 5a that is a convex surface having a positive refracting power toward the object and a fifth b surface 5b that is a concave surface having a negative refracting power toward the image, and the sixth lens 6 may have a sixth a surface 6a that is a concave surface having a negative refracting power toward the object and a sixth b surface 6b that is convex surface having a positive refracting power toward the image.

The relay unit 20 may include a seventh lens 7 and an eighth lens 8, which are sequentially arranged and become more distant from the object.

The seventh lens 7 may have a seventh a surface 7a that is a concave surface having a negative refracting power toward the object and a seventh b surface 7b that is a convex surface having a positive refracting power toward the image, and the eighth lens 8 may have an eighth a surface 8a that is a concave surface having a negative refracting power toward the object and an eighth b surface 8b that is a convex surface having a positive refracting power toward the image.

When a lens is used, aberration may be inevitably generated. When the central portion of a lens is used, a clear image may be formed. However, when the image is formed using the edge of the lens, the image may be unclear or distorted. This is because light consists of many monochromatic lights having different wavelength and a lens has a spherical surface. This is called aberration of a lens. There are various types of signal lens, and in most cases, a combination lens may be formed using different types of single lenses to correct aberration.

Generally, in a related art, different lenses may be combined into one group, and aberration correction may be performed on each group. In this embodiment, however, the image forming unit and the relay unit may be considered as one system to correct aberration.

The third a surface 3a, fifth a surface 5a, sixth b surface 6b, and seventh b 7b surface may be configured to have aspherical surfaces, and other surfaces may be configured to have spherical surfaces. The aspherical lenses may be difficult to process compared to the spherical lenses. Accordingly, spherical lenses may be preferable to aspherical lenses, while lenses may be configured to have aspherical surface to correct aberration generated in an optical system.

In this embodiment, lenses may be arranged considering that processing is difficult when both surfaces of a lens are aspherical or one surface thereof is aspherical and concave. In other words, there is no case in which both surfaces of a lens are aspherical in this embodiment. Also, there is no case in which one surface of a lens is aspherical and simultaneously concave.

Meanwhile, the first lens 1, the second lens 2, the fourth lens 4, and the eighth lens 8 may be formed of silicon, and the third lens 3, the fifth lens 5, the sixth lens 6, and the seventh lens 7 may be formed of germanium.

This is because an aspherical surface is more difficult to process than a spherical surface and thus processing becomes more difficult when the aspherical surface is formed of germanium.

Detailed dimensions of lenses used in this embodiment are described in Table 1.

TABLE 1

| Lens No. | Lens Surface No. | Radius (mm) | Thickness (mm) |
|---|---|---|---|
| 1 | 1a | 45.147 | 4.5 |
|  | 1b | 30.3251 |  |
| 2 | 2a | 37.48003 | 5 |
|  | 2b | 109.209 |  |
| 3 | 3a | 587.955 | 3 |
|  | 3b | 57.478 |  |
| 4 | 4a | 24.716 | 5 |
|  | 4b | 41.822 |  |
| 5 | 5a | 20.9215 | 4 |
|  | 5b | 12.387 |  |

TABLE 1-continued

| Lens No. | Lens Surface No. | Radius (mm) | Thickness (mm) |
|---|---|---|---|
| 6 | 6a | 27.279 | 4.5 |
|   | 6b | 25.581 |   |
| 7 | 7a | 53.948 | 3 |
|   | 7b | 87.316 |   |
| 8 | 8a | 160.897 | 4.5 |
|   | 8b | 30.766 |   |

Distance between lenses and detailed dimensions thereof are shown in FIG. 2. In FIG. 2, numerical values except reference numerals signify values used in the optical system. A path of the wavelength of light transmitting lenses may be shown like lines of FIG. 2. Light from an object first transmits the first lens 1, and finally transmits the eighth lens 8.

A window 30 may be disposed closer to an image than the eight lens 8 such that a portion of the wavelength of light that has transmitted the eighth 8 may be filtered to finally form an image on a camera.

The lenses 1 to 8 may be configured to have a thickness T1 to T8 of about 4.5 mm, about 5 mm, about 3 mm, about 5 mm, about 4 mm, about 4.5 mm, about 3 mm, about 4.5 mm, respectively. In this case, the thickness T of the lenses 1 to 8 means the thickness of the central portion of the lenses 1 to 8, respectively.

Figure 4:
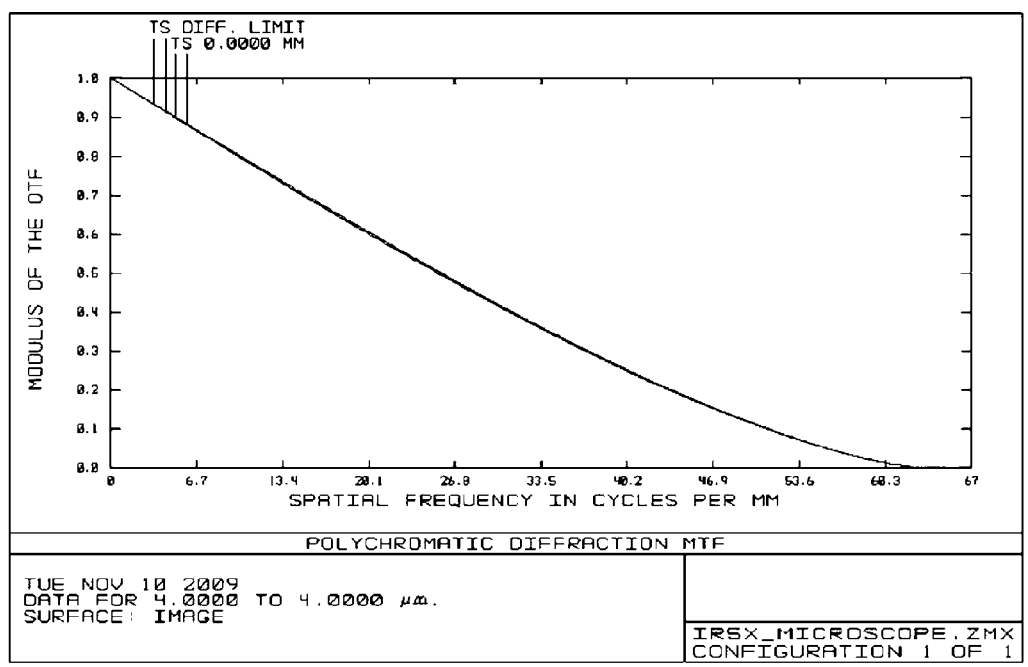
FIGS. 4 through 6 are views illustrating experimental results according to embodiments of the present invention.
Figure 5:
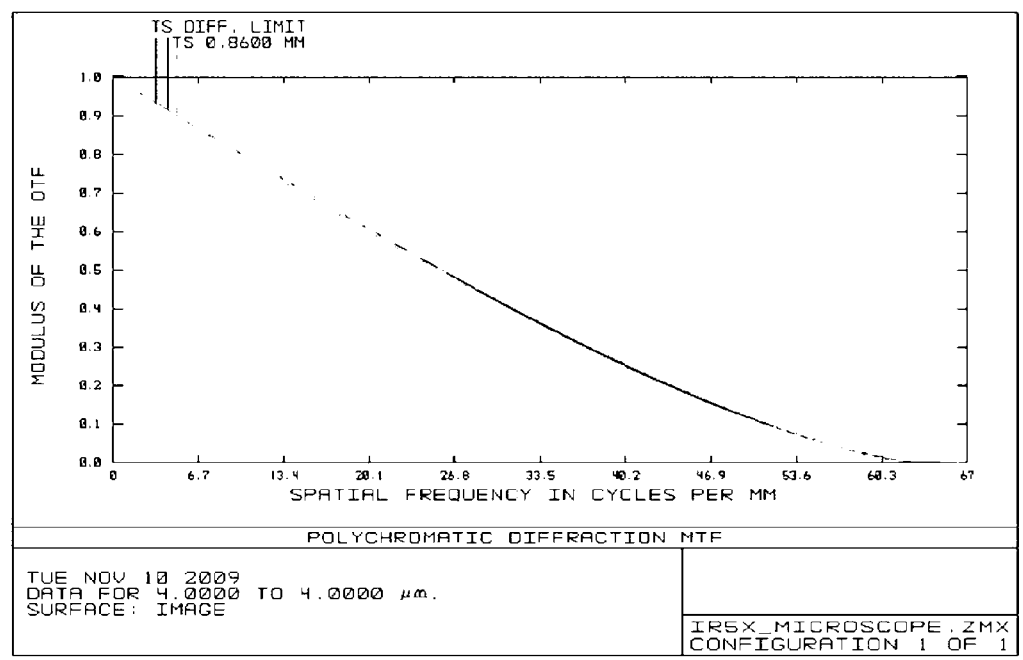
Figure 6:
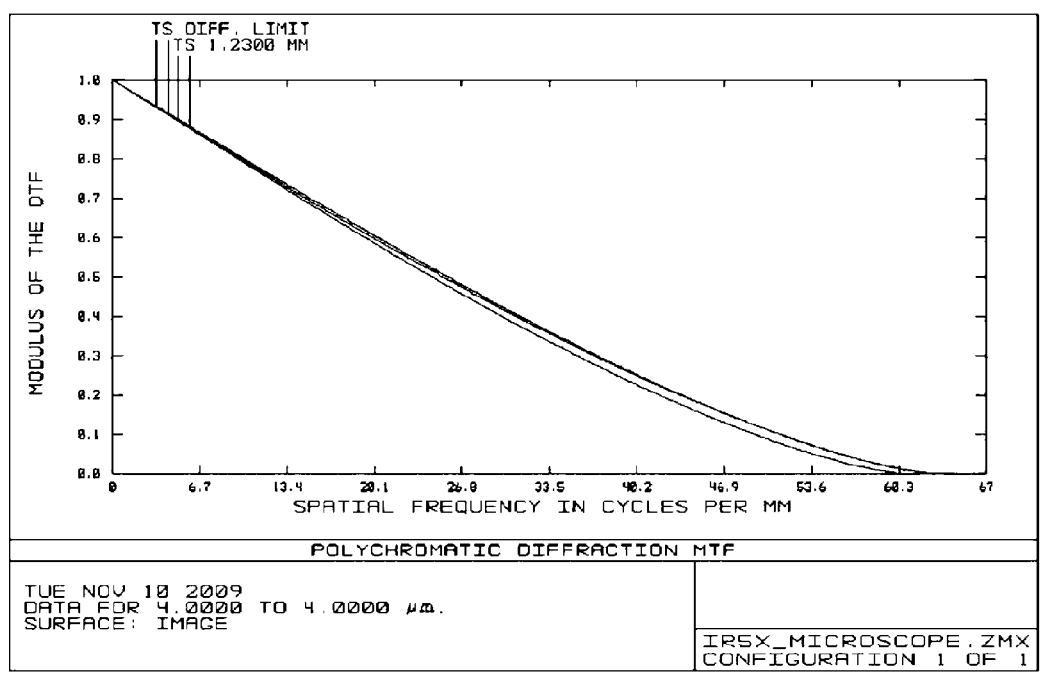

FIGS. 4 through 6 are views illustrating experimental results according to embodiments of the present invention. Hereinafter, a detailed description of the experimental results will be made with reference to the accompanying drawings.

Although not shown in the table and drawings, the optical system according to an embodiment of the present invention may have an improved optical performance compared to a related-art in that the optical system has relatively high MTF performance of about 75% or more with respect to the resolution of 5 μm and about 65% or more with respect to the resolution of 3 μm.

When a distance from an object is about 15 mm or more, and a wavelength of about 4 μm is sensed, experimental values are shown in Table 2, and graphs are shown using data thereof in FIGS. 4 to 6. In Table 2 and FIGS. 4 to 6, it can be verified that the optical performance has been improved to a degree of approaching theoretical limit.

TABLE 2

|   |   | 10 cycle/mm | 16 cycle/mm |
|---|---|---|---|
| Field(0, 0) | Diffraction Limit MTF | 0.804 | 0.678 |
|   | Nominal MTF | 0.803 | 0.675 |
| Field(0, 0.7) | Diffraction Limit MTF | 0.801 | 0.680 |
|   | Nominal MTF | 0.795 | 0.671 |
| Field(0, 1) | Diffraction Limit MTF | 0.782 | 0.667 |
|   | Nominal MTF | 0.772 | 0.650 |

Table 2 shows a spatial resolution at the center wavelength (about 4 μm) and a change of MTF according to fields. In Table 2, field (0, 0.7) and field (0, 1) are ratios when the total filed is considered as (0, 0)~(0, 1), and mean about 0.86 mm and about 1.23 mm in FIGS. 4 to 6, respectively.

The experimental results regarding field (0, 0), field (0, 0.7), and field (0, 1) are shown in FIGS. 4 to 6, respectively.

In FIGS. 4 to 6, TS DIFF. LIMIT indicates a theoretical limit. Since TS 0.0000, TS 0.86000, and TS 1.2300 according to an embodiment of the present invention are very similar to the theoretical limit, it can be verified that the optical performance has been improved.

There are spherical aberration, coma aberration, and chromatic aberration as examples of aberration that is a limitation in designing the optical system for the thermal image microscope according to an embodiment of the present invention. In the case of chromatic aberration, since the wavelength ranges from about 3 μm to 5 μm, it can be removed through combination of aspherical lenses. The spherical aberration may be minimized by designing the convex surface of the fifth lens with an aspherical surface, thereby developing an optical system for a thermal image microscope with improved optical performance.

Although an optical system for a thermal image microscope has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:

1. An optical system for a thermal image microscope, comprising:
an image forming unit for forming a focus; and
a relay unit for elongating an optical path,
wherein the image forming unit comprises six lenses;
the relay unit comprises two lenses;
aspheric surfaces of the lenses are all convex surfaces; and
the image forming unit comprises:
a first lens having a first surface that is a concave surface having a negative refracting power toward an object and a first surface that is a convex surface having a positive refracting power toward an image;
a second lens having a second surface that is a convex surface having a positive refracting power toward the object and a second surface that is a concave surface having a negative refracting power toward the image;
a third lens having a third surface that is a convex surface having a positive refracting power toward the object and a third surface that is a concave surface having a negative refracting power toward the image;
a fourth lens having a fourth surface that is convex surface having a positive refracting power toward the object and a fourth surface that is a concave surface having a negative refracting power toward the image;
a fifth lens having a fifth surface that is a convex surface having a positive refracting power toward the object and a fifth surface that is a concave surface having a negative refracting power toward the image; and
a sixth lens having a sixth surface that is a concave surface having a negative refracting power toward the object and a sixth surface that is convex surface having a positive refracting power toward the image; and
the relay unit comprises:
a seventh lens having a seventh surface that is a concave surface having a negative refracting power toward the object and a seventh surface that is a convex surface having a positive refracting power toward the image; and
an eighth lens having an eighth surface that is a concave surface having a negative refracting power toward the object and an eighth surface that is a convex surface having a positive refracting power toward the image, which are sequentially arranged and become more distant from an object.

2. The optical system of claim 1, wherein the third surface, the fifth surface, the sixth surface, and the seventh surface are aspherical surfaces, and other surfaces are spherical surfaces.

3. The optical system of claim 1, wherein the first lens, the second lens, the fourth lens and the eighth lens are formed of silicon, and the third lens, the fifth lens, the sixth lens and the seventh lens are formed of germanium.

4. The optical system of claim 1, wherein the radius of each of lenses and the thickness at the center of each of lenses satisfy Table 1:

TABLE 1

| Lens No. | Lens Surface No. | Radius(mm) | Thickness (mm) |
|---|---|---|---|
| 1 | 1a | 45.147 | 4.5 |
|   | 1b | 30.3251 |   |
| 2 | 2a | 37.48003 | 5 |
|   | 2b | 109.209 |   |
| 3 | 3a | 587.955 | 3 |
|   | 3b | 57.478 |   |
| 4 | 4a | 24.716 | 5 |
|   | 4b | 41.822 |   |
| 5 | 5a | 20.9215 | 4 |
|   | 5b | 12.387 |   |
| 6 | 6a | 27.279 | 4.5 |
|   | 6b | 25.581 |   |
| 7 | 7a | 53.948 | 3 |
|   | 7b | 87.316 |   |
| 8 | 8a | 160.897 | 4.5. |
|   | 8b | 30.766 |   |

* * * * *